(12) United States Patent
Shih

(10) Patent No.: US 7,847,987 B2
(45) Date of Patent: *Dec. 7, 2010

(54) METHOD OF COMPENSATING A ZIPPER IMAGE BY A K-VALUE AND A METHOD OF CALCULATING A K-VALUE

(76) Inventor: Chen-Hsiang Shih, No. 37-3, Yung-Feng Lane, Ho-Ming Village, Hsiu-Shui Hsiang, Chang-Hua Hsien (TW)

(*) Notice: Subject to any disclaimer, the term of this patent is extended or adjusted under 35 U.S.C. 154(b) by 995 days.

This patent is subject to a terminal disclaimer.

(21) Appl. No.: 11/502,133

(22) Filed: Aug. 9, 2006

(65) Prior Publication Data

US 2007/0035787 A1    Feb. 15, 2007

Related U.S. Application Data

(63) Continuation of application No. 10/013,887, filed on Dec. 10, 2001.

(30) Foreign Application Priority Data

Oct. 23, 2001    (TW) .............................. 90126137 A

(51) Int. Cl.
*H04N 1/00* (2006.01)
*H04N 1/024* (2006.01)
*H04N 1/03* (2006.01)
*H04N 1/04* (2006.01)
*H04N 1/047* (2006.01)
*H04N 1/60* (2006.01)

(52) U.S. Cl. ...................... 358/504; 358/513; 358/483; 358/505; 358/474; 358/514; 358/448; 358/482; 358/463; 382/275; 382/269; 250/208.1; 250/214 C; 250/370.15; 250/214; 348/241; 348/243; 348/246; 348/248; 348/251; 348/262; 348/264; 348/275; 348/315

(58) Field of Classification Search ................. 358/513, 358/483, 505, 474, 514, 448, 482, 463, 504; 382/275, 269; 348/262, 264, 275, 315, 241, 348/243, 246, 248, 251; 250/208.1, 214 C, 250/370.15, 214

See application file for complete search history.

(56) References Cited

U.S. PATENT DOCUMENTS 4,326,258 A    4/1982    De la Guardia (Continued)

FOREIGN PATENT DOCUMENTS

| JP | 10051603 | 2/1998 |
|----|----------|--------|
| JP | 2001201324 | 7/2001 |

OTHER PUBLICATIONS

Yuzuki et al., "A 5732-Element Linear CCD Image Sensor", Aug. 1985, IEEE Transactions on Electron Devices, vol. ED-32, pp. 1541-1545.

*Primary Examiner*—David K Moore
*Assistant Examiner*—Beniyam Menberu
(74) *Attorney, Agent, or Firm*—Stolowitz Ford Cowger LLP

(57) ABSTRACT

A method is disclosed as including scanning a first pixel of an image with a primary scanning line of a sensor, and scanning a second pixel of the image with a secondary scanning line of the sensor, wherein the first pixel is separated from the second pixel by a pitch of one or more scan lines. A compensation value is determined for one or more pixels of the image, wherein the compensation value is determined based, at least in part, on a mathematical operation comprising pixel values associated with the first and second pixels and the pitch. The method further includes compensating the one or more pixel values based, at least in part, on the compensation value, wherein the compensation value compensates for a reflection of light between the first and second scanning lines when the first and second pixels are scanned.

26 Claims, 4 Drawing Sheets

U.S. PATENT DOCUMENTS

| | | | |
|---|---|---|---|
| 4,628,211 A * | 12/1986 | Ruppert | 348/248 |
| 4,703,363 A | 10/1987 | Kitamura | |
| 4,734,583 A * | 3/1988 | Wang et al. | 250/332 |
| 4,774,569 A | 9/1988 | Morton et al. | |
| 4,873,570 A | 10/1989 | Suzuki et al. | |
| 4,953,014 A | 8/1990 | Takaragi | |
| 4,974,072 A * | 11/1990 | Hasegawa | 358/514 |
| 5,014,333 A | 5/1991 | Miller et al. | |
| 5,031,227 A | 7/1991 | Raasch et al. | |
| 5,055,855 A | 10/1991 | Nishio | |
| 5,070,414 A | 12/1991 | Tsutsumi | |
| 5,140,445 A * | 8/1992 | Takashima et al. | 348/244 |
| 5,198,909 A * | 3/1993 | Ogiwara et al. | 358/412 |
| 5,355,164 A | 10/1994 | Shimoyama et al. | |
| 5,404,233 A | 4/1995 | Nagata et al. | |
| 5,528,274 A | 6/1996 | Hyodo | |
| 5,528,296 A | 6/1996 | Gove et al. | |
| 5,610,403 A * | 3/1997 | Kingsley et al. | 250/370.09 |
| 5,673,336 A * | 9/1997 | Edgar et al. | 382/167 |
| 5,703,845 A | 12/1997 | Audoin et al. | |
| 5,859,712 A | 1/1999 | Kim | |
| 5,870,142 A * | 2/1999 | Noda et al. | 348/266 |
| 5,881,182 A * | 3/1999 | Fiete et al. | 382/275 |
| 5,920,646 A | 7/1999 | Kamon | |
| 5,940,125 A | 8/1999 | Suganuma | |
| 5,995,675 A | 11/1999 | Hwang | |
| 6,034,724 A * | 3/2000 | Nakamura | 348/241 |
| 6,034,794 A | 3/2000 | Suganuma | |
| 6,034,795 A | 3/2000 | Smitt | |
| 6,081,625 A | 6/2000 | Sakaue | |
| 6,115,147 A | 9/2000 | Mizumoto et al. | |
| 6,144,469 A | 11/2000 | Suganuma | |
| 6,205,428 B1 | 3/2001 | Brown et al. | |
| 6,212,303 B1 | 4/2001 | Doran et al. | |
| 6,233,011 B1 | 5/2001 | Su | |
| 6,288,797 B1 | 9/2001 | Ueno | |
| 6,316,761 B1 | 11/2001 | Yamaguchi | |
| 6,496,286 B1 * | 12/2002 | Yamazaki | 358/514 |
| 6,507,364 B1 | 1/2003 | Bishay et al. | |
| 6,567,192 B1 | 5/2003 | Toyomura et al. | |
| 6,606,172 B1 | 8/2003 | Moro | |
| 6,646,681 B1 * | 11/2003 | Macy et al. | 348/241 |
| 6,665,454 B1 | 12/2003 | Silverbrook et al. | |
| 6,674,903 B1 | 1/2004 | Cliquet | |
| 6,678,000 B1 | 1/2004 | Sakata | |
| 6,720,594 B2 * | 4/2004 | Rahn et al. | 257/291 |
| 6,744,916 B1 | 6/2004 | Takahashi | |
| 6,894,812 B1 | 5/2005 | Spears | |
| 6,965,463 B1 | 11/2005 | Moritaku et al. | |
| 7,177,482 B2 | 2/2007 | Ohki et al. | |
| 7,203,379 B1 * | 4/2007 | Najand | 382/275 |
| RE40,179 E | 3/2008 | Kim | |
| 7,515,317 B2 * | 4/2009 | Shih | 358/513 |
| 2002/0085217 A1 | 7/2002 | Sakaue et al. | |
| 2002/0093581 A1 * | 7/2002 | Ikeda et al. | 348/302 |
| 2002/0186422 A1 | 12/2002 | Chang et al. | |
| 2003/0001078 A1 * | 1/2003 | Baharav et al. | 250/208.1 |
| 2003/0048958 A1 | 3/2003 | Ishiguro | |
| 2003/0063201 A1 | 4/2003 | Hunter et al. | |
| 2004/0096099 A1 | 5/2004 | Chang et al. | |

OTHER PUBLICATIONS

Yuzuki et al., "A 5732-Element Linear CCD Image Sensor", Aug. 1985, IEEE Transactions on Electron Devices, vol. ED-32, pp. 1541-1545.

USPTO; File History; U.S. Appl. No. 11/334,640 to Shih, filed Jan. 17, 2006.

USPTO; File History; U.S. Appl. No. 10/013,887 to Shih, filed Dec. 10, 2001.

USPTO; File History; U.S. Appl. No. 10/047,680 to Shih, filed Jan. 14, 2002.

Zhang et al, "Color Imaging for Digital Cameras With a Single CCD Sensor", Oct. 2000, Industrial Electronics Society, vol. 3, pp. 2007-2012.

Bae et al, "3CCD Interpolation Using Selective Projection", Mar. 2005, Acoustics, Speech, and Signal Processing, vol. 3, pp. ii/605-ii/608.

Harada et al, "A High-Resolution Staggered-Configuration CCD Imager Overlaid with an a-Si:H Photoconductive Layer", Aug. 1985, IEEE Transactions on Electron Devices, vol. 32, Issue 8, pp. 1499-1504.

Yuzuki et ai, "A 5732-Element Linear CCD Image Sensor", Aug. 1985, IEEE Transactions on Electron Devices, vol. 32, Issue 8, pp. 1541-1545.

* cited by examiner

METHOD OF COMPENSATING A ZIPPER IMAGE BY A K-VALUE AND A METHOD OF CALCULATING A K-VALUE

CROSS-REFERENCE TO RELATED APPLICATIONS

This is a Continuation patent application of U.S. patent application Ser. No. 10/013,887, filed Dec. 10, 2001, which claims the benefit of foreign priority under 35 USC §119(a) to Taiwan, R.O.C Application Serial No. 90126137, filed Oct. 23, 2001.

BACKGROUND OF THE INVENTION

1. Field of the Invention

The invention relates in general to a method of compensating a zipper image, and more particularly, to a method of compensating a zipper image by using K-value and a method to calculate the K-value.

2. Description of the Related Art

FIG. 1 shows a staggered charge coupled device (CCD) of a scanner 100. As shown in FIG. 1, the scanner 100 is connected to a host computer 150. The scanner 100 includes a staggered CCD 110 that has one primary line and one secondary line for each color, an application specific integrated circuit (ASIC) 120, an image compensation buffer 130, and an I/O interface 140. Before scanning, the scanner 100 performs an image compensation operation so that an image compensation parameter is obtained and saved in the host computer 150.

When the staggered CCD 110 scans any part of a document, an image compensation parameter related to this part is retrieved from the host computer 150, and transmitted to the image compensation buffer 130 via the I/O interface 140. The intermittently scanned image scanned by the staggered CCD 110 is then corrected by the ASIC 120 according to the image compensation parameter transmitted from the image compensation buffer 130. The corrected image is then transmitted to the host computer for storage via the I/O interface 140.

When the staggered CCD scans an image, if the line distance between the primary line and the secondary line is short, the primary line is inevitably affected by the light reflected from the secondary line. Similarly, the light reflected from the primary line vice versa also affects the secondary line. The fidelity of the document (as shown in FIG. 2) is easily deteriorated. Further, after scanning with a staggered CCD, a so-called zipper image (as shown in FIG. 3) is likely to occur. The zipper image is more significant for a document having a black-and-white boundary. Such zipper image causes errors for image scanning. Currently, no answer for resolving the zipper image has been disclosed yet.

SUMMARY OF THE INVENTION

The present invention provides a method for compensating a zipper image using a K-value and a method to calculate the K-value. The K-value is mutually affected by the primary line (such as the odd pixel) and the secondary line (such as the even pixel) of the staggered CCD calculated according to a leading edge reference (LER) so that an appropriate K-value can be obtained.

The method of compensating a zipper image by the K-value is applicable to a scanner with a staggered CCD, of which each color has a primary line and a secondary line for scanning documents. First, determine whether the nth (n is a positive integer) pixel of the mth line (m is a positive integer) is scanned by the primary line. If the nth primitive pixel of the mth line is scanned by the primary line, the nth primitive pixel of the mth line is compensated as the nth compensated pixel of the mth line. The nth compensated pixel is obtained by the nth primitive pixel of the mth line subtracting a multiplication of the K-value and a sum of the (n−1)th pixel of the (m−k)th line and the (n+1)th pixel of the (m−k)th line. If the nth primitive pixel of the mth line is obtained from a secondary line, the nth pixel of the mth line is compensated as the nth compensated pixel of the mth line, which is equal to the nth primitive pixel of the mth minus a sum of the (n−1)th primitive pixel of the (m+k)th line and the (n+1)th primitive pixel of the (m+k)th line times the K-value.

In one preferred embodiment of the present invention, the K-value is a ratio constant for the mutual influence between the primary line and the secondary line. In addition, the K-value is calculated according to the leading edge reference.

The present invention further provides a method of using the leading edge reference to calculate the K-value, which is applicable to a scanner with a staggered CCD that has a primary line and a secondary line for each color for scanning a document. If the leading edge reference is the mth line, and the nth primitive pixel of the mth line is scanned by the primary line, the nth primitive pixel of the mth line minus the (n+1)th pixel of the mth line, and then divided by a sum of the (n−1)th pixel of the (m−k)th line and the (n+1)th pixel of the (m−k)th line to obtain the $K_n$-value (the nth K-value). If the leading edge reference is the mth line; and the nth primitive pixel thereof is scanned by the secondary line, the nth primitive pixel of the mth line minus the (n+1) primitive pixel of the mth line, and then divided by a sum of the (n−1)th and the (n+1)th primitive pixels of the (m+k) line to obtain the $K_n$-value (the nth K-value). The above steps are then repeated until the whole document is scanned. A sum of the resultant $K_1$-value (the first K-value), the $K_3$-value (the third K-value), and the $K_5$-value (the fifth K-value),..., and the $K_n$-value is divided by X to obtain the K-value, where X is larger than 0 and equal to (n+1)/2. The K-value is then used to compensate the zipper image.

According to the above, the present invention appropriately compensate the zipper image by properly calculating the K-value. Therefore, when a scanner with a staggered CCD scans a document, the scanner used in the present invention obtains a scanned image almost identical to the real image.

Both the foregoing general description and the following detailed description are exemplary and explanatory only and are not restrictive of the invention, as claimed.

DESCRIPTION OF THE PREFERRED EMBODIMENTS

When the pitch between the primary line and the secondary line scanned by a staggered CCD is very short, the primary line is affected by the light reflected from the secondary line while the secondary line is affected by the light reflected from the primary line vice versa. Therefore, the constant K-value related to the mutually influence of the primary line and the second line can be calculated while finding the leading edge reference. Since the structure of the primary line is the same as that of the secondary line, only the K-value for affecting the primary line by the secondary line is calculated. The compensation is performed by only determining the primary line or the second line.

Figure 1:
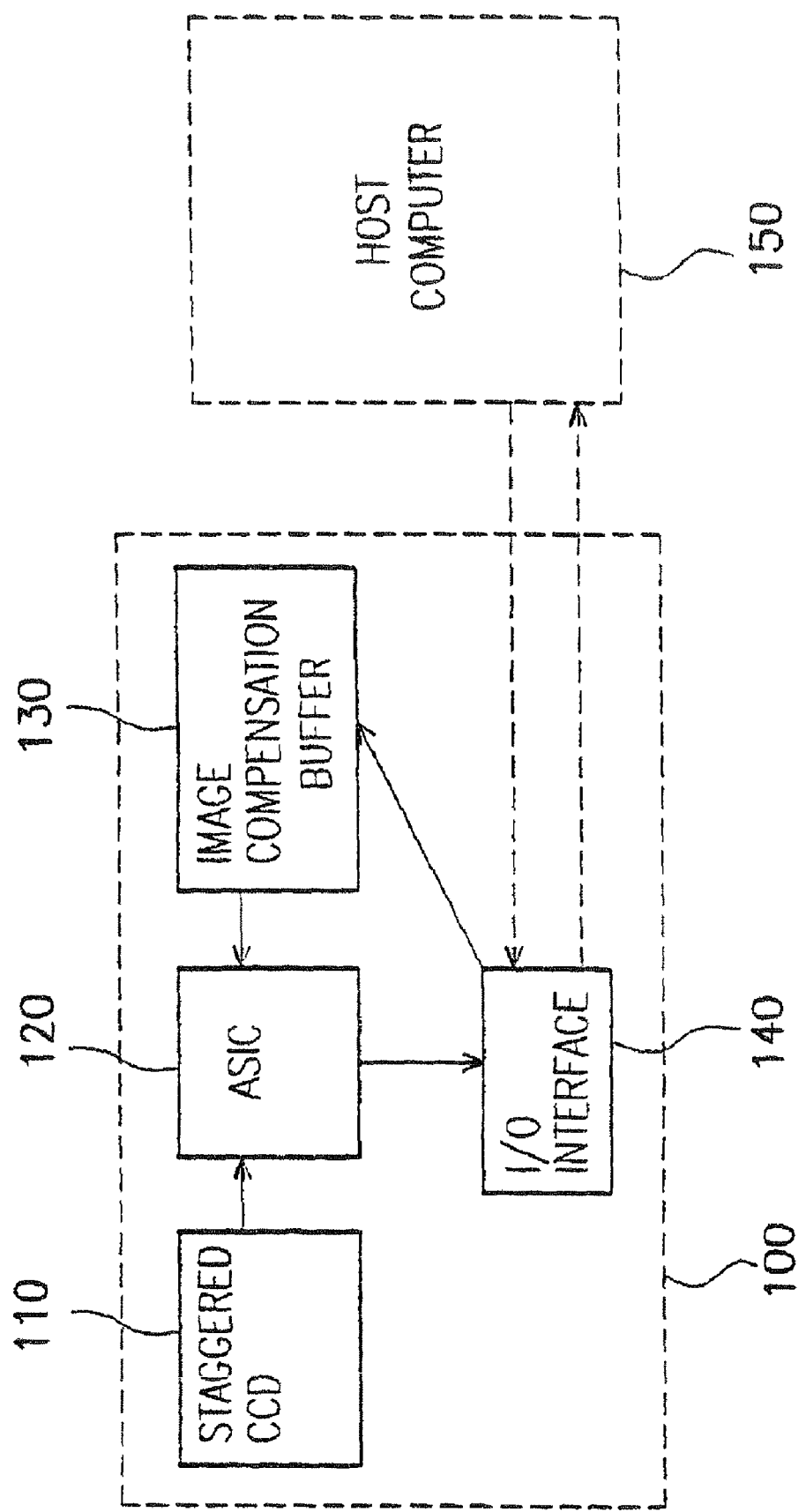
FIG. 1 shows a block diagram of a scanner with a staggered CCD.
Figure 2:
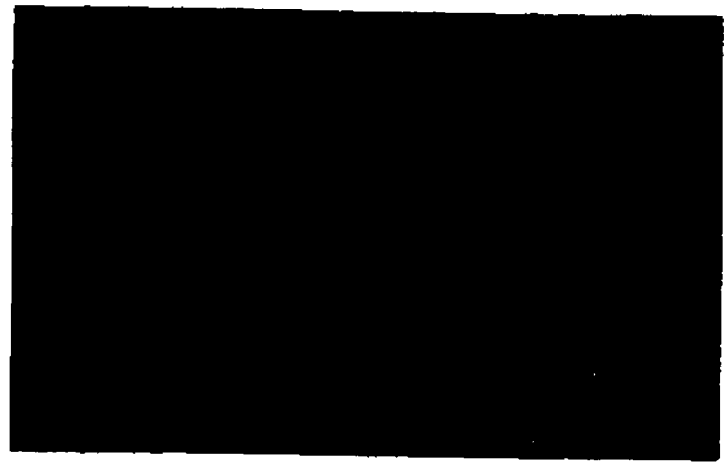
FIG. 2 shows a real image of a document.
Figure 3:
FIG. 3 shows the zipper image produced by scanning the document using the scanner with a staggered CCD.
Figure 4A:
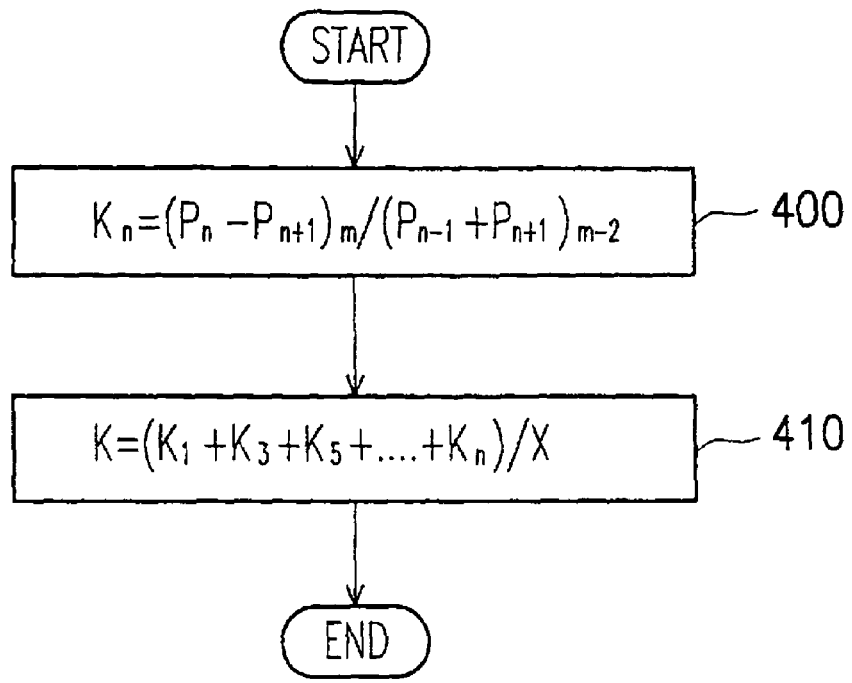
FIG. 4A shows an embodiment of the present invention, which uses the leading edge reference to calculate the K-value.
Figure 4B:
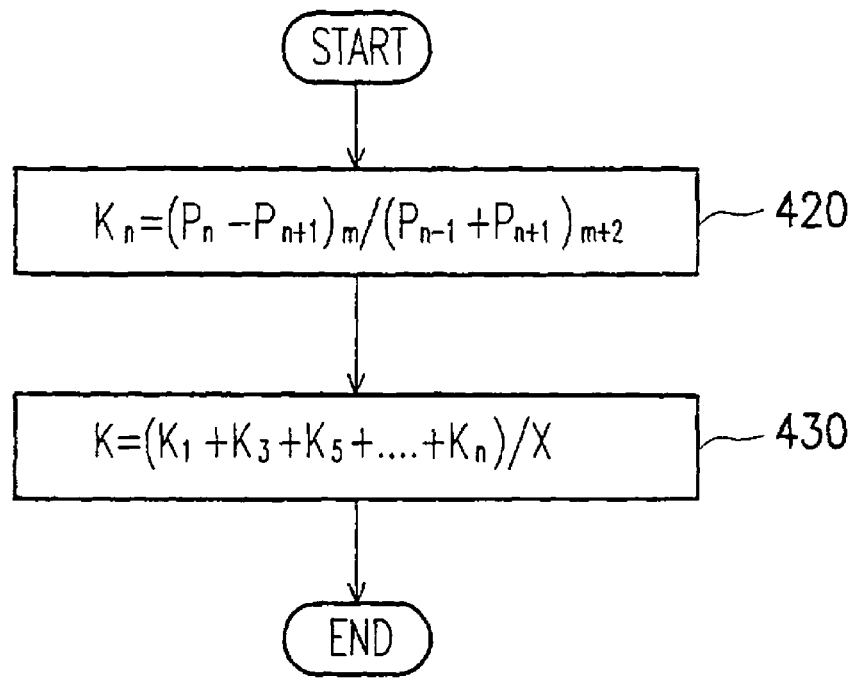
FIG. 4B shows another embodiment of the present invention, which uses the leading edge reference to calculate the K-value.

FIG. 4A shows an embodiment of the present invention that uses the leading edge reference to calculate the K-value. FIG. 4B shows another embodiment of the invention that uses the leading edge reference to calculate the K-value. In FIGS. 4A and 4B, assuming that the pitch between the primary line and the secondary line is two lines, the leading edge reference to be determined is called the mth (m is an integer) line, and $X=(n+1)/2$, where X is a positive integer.

To find the leading edge reference while using a scanner with a staggered CCD for scanning a document, a correction pattern containing a black-and-white pattern is required to determine the leading edge reference. In FIG. 4A, when the nth primitive pixel $(P_n)_m$ of the leading edge reference mth line is scanned by the primary line, the nth primitive pixel of the mth line minus the (n+1)th primitive pixel of the mth line $(P_{n+1})m$ and then divided by a sum of the (n−1)th primitive pixel $(P_{n-1})_{m-2}$ and the (n+1)th primitive pixel $(P_{n+1})_{m-2}$ of the (m−2)th line to obtain the nth K-value. That is, $K_n=(P_n-P_{n+1})_m/(P_{n-1}+P_{n+1})_{m-2}$ (as the step s400). The above steps are repeated until the whole document is scanned. A sum of the $K_1$-value (the first K-value), the $K_3$-value (the third K-value), the $K_5$-value (the fifth K-value),..., and the $K_n$-value (the nth K-value) is divided by X to obtain the K-value (such as step s410) to compensate the zipper image.

Referring to FIG. 4B, when the nth primitive pixel $(P_n)_m$, of the leading edge reference (the mth line) is scanned by the secondary line, the nth primitive pixel of the mth line $(P_n)_m$ minus the (n+1)th primitive pixel of the mth line $(P_{n+})_m$, and divided by a sum of the (n−1)th primitive pixel of the (m+2)th line $(P_{n-1})_{m+2}$ and the (n+1)th primitive pixel of the (m+2)th line $(P_{n+1})_{m+2}$ to obtain the nth K-value. That is, $K_n=(P_n-P_{n+1})_m/(P_{n-1}+P_{n+1})_{m+2}$ (as step s420). The above steps are repeated until the whole document is scanned. A sum of the $K_1$-value (the first K-value), the $K_3$-value (the third K-value), the $K_5$-value (the fifth K-value)..., the $K_n$-value (the nth K-value) is then divided by X to obtain the K-value (in step s430) to compensate the zipper image.

Figure 5:
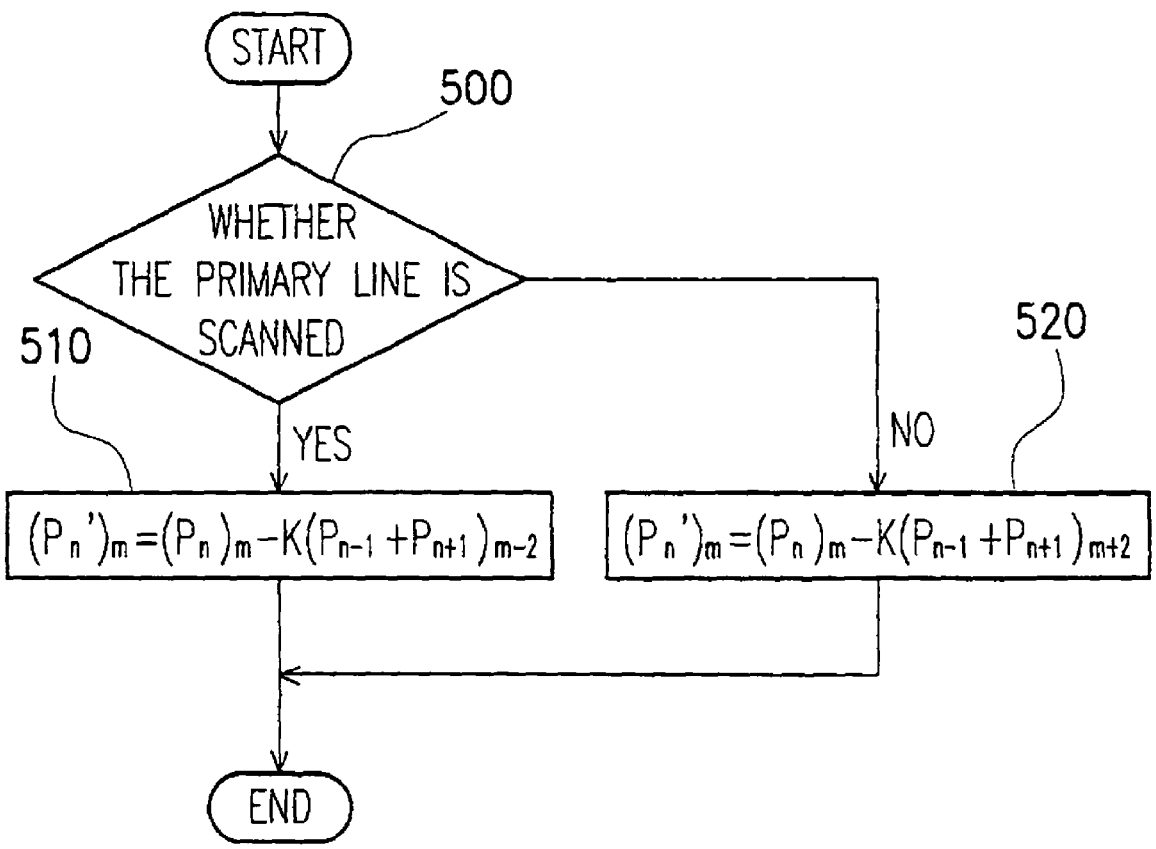
FIG. 5 shows a process flow for using the K-value to compensate the zipper image according to the present invention.

The above K-value is then used to compensate the zipper image. FIG. 5 shows a process flow of using the K-value to compensate the zipper image. In FIG. 5, the pitch between the primary line and the secondary line is two lines.

In this embodiment, whether the nth (n is a positive integer) primitive pixel of the mth line (m is positive integer) is scanned and obtained by the primary line is determined (In s500). If the nth primitive pixel of the mth line is scanned by the primary line, the nth primitive pixel of the mth line $(P_n)_m$ is compensated as the nth compensated pixel of the mth line $(P_n')m$. The $(P_n')_m$ is obtained by the nth primitive pixel of the mth line $(P_n)_m$ minus a multiplication of the K-value and the sum of the (n−1)th and (n+1)th primitive pixels of the (m−2)th line. That is, $(P_n')_m=(P_n)_m-K(P_{n-1}+P_{n+1})_{m-2}$ (such as s510). If the nth primitive pixel of the mth line is scanned by the secondary line, the nth primitive pixel of the mth line $(P_n)_m$ is compensated as the nth compensated pixel of the mth line $(P_n')m$. The $(P_n')_m$ is obtained by the nth primitive pixel of the mth line $(P_n)_m$ minus a multiplication of the K-value and a sum of the (n−1)th and (n+1)th primitive pixels of the (m+2)th line. That is, $(P_n')_m=(P_n)_m-K(P_{n-1}+P_{n-})_{m+2}$ (such as s520). The above steps are repeated until the whole document is scanned so the zipper image can be properly compensated.

According to the above, the present invention has the following advantages.

1. The K-value calculated from the leading edge reference allows the zipper image produced by scanning a document using a scanner with a staggered CCD to be properly compensated.

2. The scanned image is almost identical to the real image.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. An apparatus, comprising:
    means for scanning an image with an image sensor comprising a primary scanning line and a secondary scanning line, wherein the primary scanning line and the secondary scanning line are separated by a pitch;
    means for determining a compensation value for one or more pixels of the scanned image, wherein the compensation value is determined from a first pixel scanned by the primary scanning line and a second pixel scanned by the secondary scanning line, and wherein the first pixel and the second pixel are separated by the pitch; and
    means for compensating for a reflection of light between the primary scanning line and the secondary scanning line when the first and second pixels are scanned, wherein the one or more pixels are compensated based, at least in part, on the compensation value.

2. The apparatus of claim 1, wherein the compensation value is further determined based, at least in part, on the pitch between the primary scanning line and the secondary scanning line.

3. The apparatus of claim 1, wherein the compensation value comprises a constant.

4. An apparatus, comprising:
    an image sensor comprising a primary scanning line and a secondary scanning line, wherein the primary scanning line and the secondary scanning line are separated by a pitch comprising one or more pixels;
    compensation circuitry configured to determine a compensation value for a scanned image, wherein the compensation value is determined based, at least in part, on a first pixel value of the scanned image obtained from the primary scanning line and a second pixel value of the scanned image obtained from the secondary scanning line, and wherein the first pixel value and the second pixel value are associated with corresponding pixels separated by the pitch; and
    application circuitry configured to compensate the scanned image based, at least in part, on the compensation value, wherein the compensation value compensates for a reflection of light between the primary scanning line and the secondary scanning line in obtaining the first and second pixel values.

5. A method, comprising:
scanning a first pixel of an image with a primary scanning line of a sensor;
scanning a second pixel of the image with a secondary scanning line of the sensor, wherein the first pixel is separated from the second pixel by a pitch of one or more scan lines;
determining a compensation value for one or more pixels of the image, wherein the compensation value is determined based, at least in part, on a mathematical operation comprising pixel values associated with the first and second pixels and the pitch; and
compensating the one or more pixel values based, at least in part, on the compensation value, wherein the compensation value compensates for a reflection of light between the first and second scanning lines when the first and second pixels are scanned.

6. A scanner, comprising:
a primary scanning line configured to scan a first pixel of a scanned image;
a secondary scanning line configured to scan a second pixel of the scanned image, wherein the first pixel is scanned at a same time as the second pixel;
a compensation buffer configured to determine a compensation value for the scanned image, wherein the compensation value is determined based, at least in part, on a mathematical operation comprising pixel values associated with the first and second pixels of the scanned image and a pitch between the secondary scanning line and the primary scanning line; and
an application specific integrated circuit (ASIC) configured to compensate the scanned image for a reflection of light between the primary scanning line and the secondary scanning line when the first and second pixels are scanned, wherein the scanned image is compensated based, at least in part, on the compensation value.

7. The scanner of claim 6, wherein the primary and secondary scanning lines are associated with a same color channel of the scanner.

8. The scanner of claim 6, wherein the first pixel is separated from the second pixel by the pitch.

9. The scanner of claim 6, wherein the pitch comprises one or more scan lines.

10. The scanner of claim 9, wherein the pitch comprises two scan lines.

11. The scanner of claim 6, wherein the mathematical operation further comprises a value associated with a third pixel that is spaced apart from the second pixel by one or more pixels.

12. The apparatus of claim 1, wherein the image sensor comprises a charge coupled device (CCD).

13. The apparatus of claim 12, wherein the CCD comprises multiple color channels, and wherein each of the multiple color channels comprises a separate set of primary and secondary scanning lines.

14. The apparatus of claim 1, wherein the pitch comprises two pixels.

15. The apparatus of claim 1, wherein the compensation value compensates for a zipper effect of the scanned image caused by the reflection of light.

16. The apparatus of claim 4, wherein the compensation value is determined from a mathematical operation comprising the first and second pixel values and the pitch.

17. The apparatus of claim 16, wherein the mathematical operation further comprises a third pixel value obtained from the secondary scanning line and taking a sum of the second and third pixel values.

18. The apparatus of claim 17, wherein the mathematical operation further comprises a fourth pixel value obtained from the primary scanning line and taking a difference between the first and fourth pixel values.

19. The apparatus of claim 18, wherein the mathematical operation further comprises dividing the difference by the sum.

20. The apparatus of claim 4, wherein the compensation value compensates for a zipper effect of the scanned image caused by the reflection of light.

21. The method of claim 5, wherein the pitch comprises two scan lines.

22. The method of claim 5, wherein the first pixel is scanned substantially at a same time as the second pixel.

23. The method of claim 5, wherein the sensor comprises a plurality of color channels, and wherein both the primary scanning line and the secondary scanning line are associated with a single color channel.

24. The method of claim 23, wherein the sensor comprises a charge coupled device.

25. The method of claim 5, wherein the first and second pixels are associated with different portions of the scanned image.

26. The method of claim 25, wherein the first and second pixels are scanned concurrently.

* * * * *

UNITED STATES PATENT AND TRADEMARK OFFICE
CERTIFICATE OF CORRECTION

PATENT NO. : 7,847,987 B2  Page 1 of 1
APPLICATION NO. : 11/502133
DATED : December 7, 2010
INVENTOR(S) : Shih It is certified that error appears in the above-identified patent and that said Letters Patent is hereby corrected as shown below:

Column 2, line 31, delete "line;" and insert -- line, --.

Column 3, line 35, delete "$(P_{n+1})m$" and insert -- $(P_{n+i})_m$ --.

Column 3, lines 37-38, delete "$K_n=(P_n-P_{n+1})m/(P_{n-1}+P_{n+1})_{m-2}$" and insert
-- $K_n=(P_n-P_{n+1})_m/(P_{n-1}+P_{n+1})_{m-2}$ --.

Column 4, line 3, delete "$_{m-2}$(such as s510)." and insert -- $_{m-2}$ (such as s510). --.

Column 4, line 5, delete "$(P_n)_m is$" and insert -- $(P_n)_m$ is --.

Column 4, line 10, delete "$P_n$-$)_{m+2}$" and insert -- $P_{n-1})_{m+2}$ --.

Signed and Sealed this
Twenty-fourth Day of May, 2011

David J. Kappos
*Director of the United States Patent and Trademark Office*